UNITED STATES PATENT OFFICE.

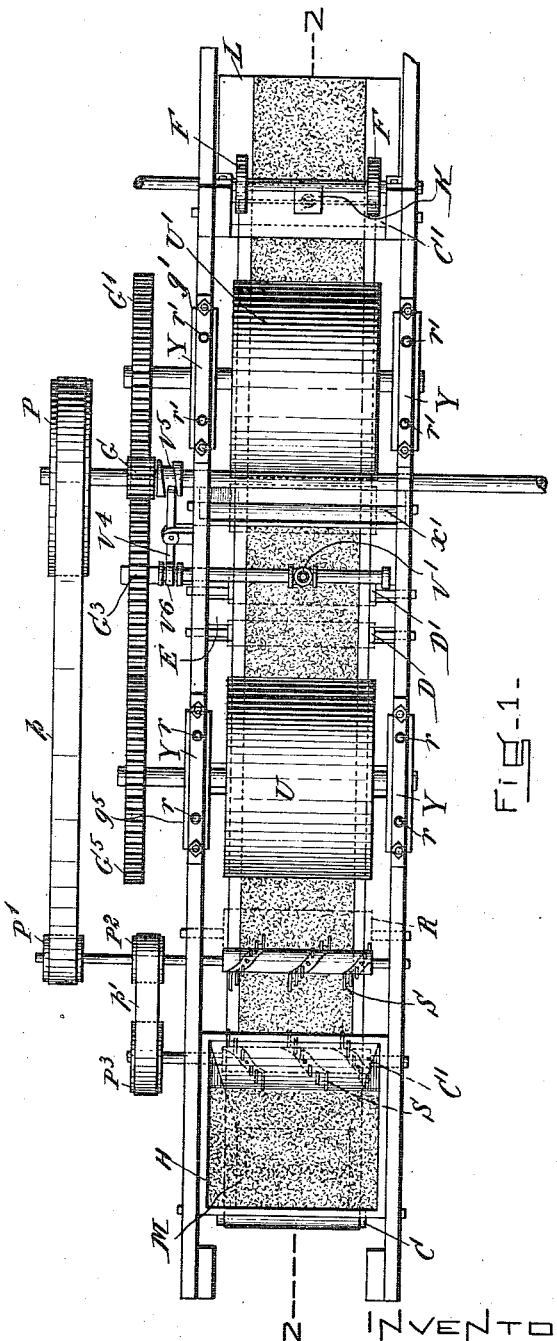

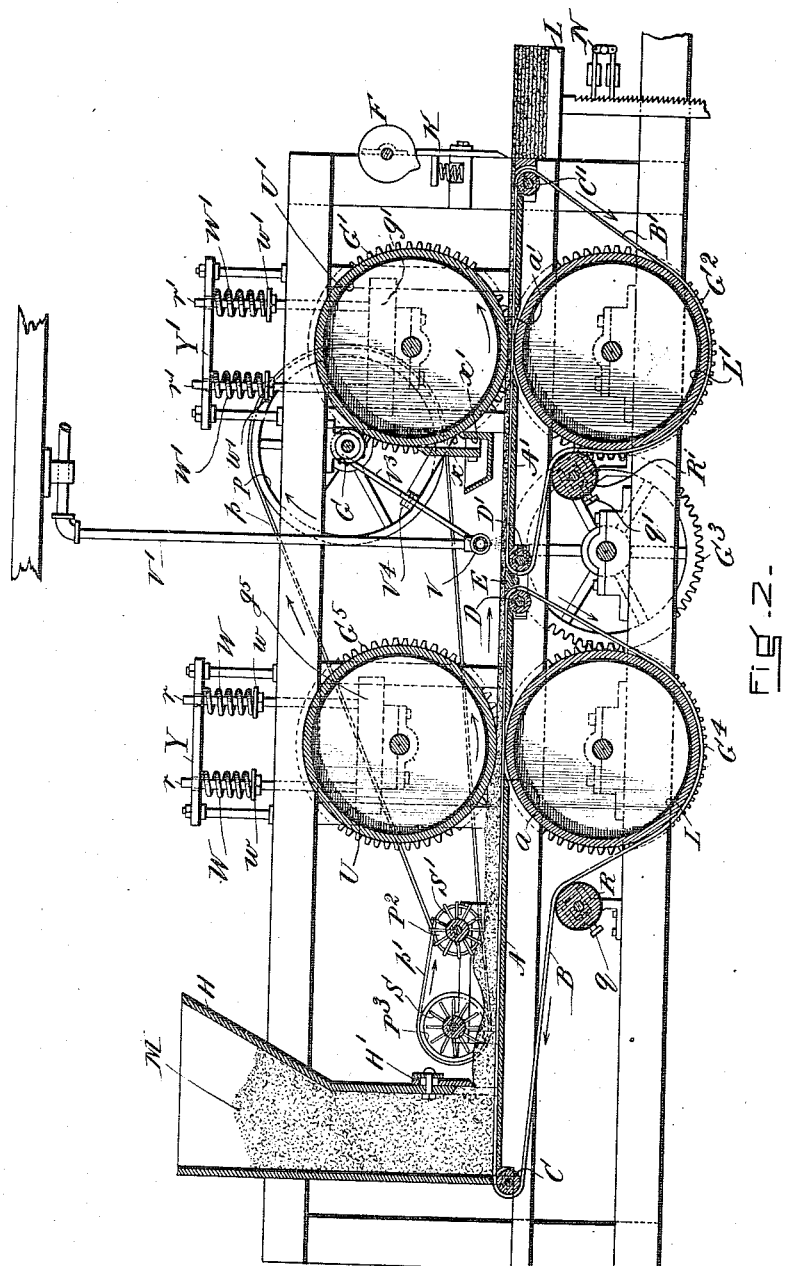

CHARLES LADD NORTON, OF HUDSON, NEW HAMPSHIRE.

PROCESS FOR FORMING FIBROUS SHEETS.

979,547.    Specification of Letters Patent.    Patented Dec. 27, 1910.

Application filed January 29, 1910. Serial No. 540,730.

*To all whom it may concern:*

Be it known that I, CHARLES LADD NORTON, a citizen of the United States, and resident of Hudson, in the county of Hillsboro and State of New Hampshire, have invented new and useful Improvements in Processes for Forming Fibrous Sheets, of which the following is a specification.

This invention relates to the manufacture of sheets, slabs, and similar articles, of cement and fiber, or fiber-concrete, and consists in a new process of manufacture whereby such articles may be made rapidly, continuously and economically.

Slabs or sheets of fiber and cement have been made singly in fiber presses, and with success, using heavy pressure upon wet mush or pulp composed of fiber and cementitious material, but though the improvements in compounding and handling such material by the press-process have reduced the cost and increased the output, the advantages of a continuous process have not, so far as I am informed, been attained.

My invention relates particularly to the manufacture of fire-proof sheets or slabs for structural and analogous purposes, in which asbestos fibers, or the similar fibers obtained by grinding serpentine rock and a hydraulic cement, constitute the ingredients of the fiber-concrete, and the following specifications will be addressed to the manufacture of asbestos fiber and hydraulic cement sheets or slabs. Such cement-asbestos concrete necessarily requires the presence of water to set the cement, and also requires considerable pressure to compact the mass before the hydration, or setting, of the cement is completed. Attempts to produce compressed sheets by feeding a wet mass of concrete-pulp through rollers or other progressive pressure devices have been embarrassed by the persistence with which the wet pulp sticks to the pressure devices and to other objects which come in contact with wet uncompressed pulp.

My improved process which obviates the difficulties encountered in handling wet uncompressed pulp, is characterized by a preliminary continuous or progressive dry pressing of a properly compounded mixture of fiber and cement; the dry pressing compacts the mixture and gives it consistency and integrity which, when setting liquid is afterward added, is effective to prevent the concrete mass from sticking to objects with which it makes contact, so that a final wet continuous or progressive pressing is easily applied to give the finished product the necessary density and strength for mechanical and structural uses, and a progressive or continuous manufacture of concreted sheets is made practical and possible.

By availing myself of the facility of handling a dry-compressed mixture of fiber and cement, I am enabled to produce compacted fiber concrete sheets continuously and rapidly in contrast with the discontinuous and slower filter press process, heretofore used in making fiber-cement sheets or slabs. In my new process, the preliminary dry-pressing is accomplished by pressure devices which preferably work progressively along a sheet or band of the dry-fiber-cement mixture, which travels under or between the pressure devices, so that, relatively speaking the pressure is a traveling pressure, exerted along a strip or band of the material. After the preliminary pressure has thus been applied, the compacted band is wetted with an appropriate setting liquid, and when saturated thereby, is given a second and heavier traveling pressure which produces the necessary density in the final product.

In practice I prefer to move the fiber-cement mixture by a continuous feed, as a band under and between two sets of pressure rollers, one set to apply the traveling or progressive pressure to the band of the material while dry, the other set to apply pressure to the band after it has been wet. This process is preferably carried out with apparatus such as is shown in the accompanying drawings, in which, Figure 1 is a longitudinal elevation, partly in section, and Fig. 2 is a plan view of a machine which exemplifies inventions which form the subject matter of an application for patent filed by me concurrently herewith and serially numbered 540,731.

The process herein described and claimed may be carried out by the aid of other and specifically different apparatus, but that shown in the drawings represents the elements of the machine which I have found to be practically effective and which I believe to be the best adapted for the purpose.

This machine comprises two departments or divisions, one in which the material is handled dry, the other in which it is handled wet. The material is formed as a band or layer, which is conveyed first through the dry division, where it is dry-pressed, is then transferred to the wet division, wetted and wet pressed, and thence emerges in compacted condition from the machine. Except for a short gap, the material is carried and sustained by belt conveyers which move at uniform speed; while on the belt in the dry division the band of material is subjected to rolling or traveling pressure, and is thereby compacted to such consistency that it projects itself without impairment of integrity across the gap between the dry and wet divisions, being sustained during part of its transit by a stationary bridge which has a smooth upper surface.

The material which I have found to be best adapted to the construction of fiber-concrete sheets or slabs is a mixture of short asbestos fibers with Portland cement. The fibers may be obtained by grinding the serpentine rock which forms the matrix of long-fibered asbestos, and then screening or cleaning the fibrous pulp thus produced. The proportions of these solid ingredients which I recommend, are by weight, one part fiber to three parts cement. These are thoroughly mixed in dry condition and are then ready for the machine.

By adding from two to ten per cent. (by weight) of finely ground quartz sand, to the dry mixture, the setting of the product is accelerated, and its strength increased.

Referring now to the drawings; H represents a hopper into which the dry mixture M, preferably compounded as above stated, is fed. At the lower or delivery end of the hopper there is provided an adjustable gate H' by which the rate of delivery of material from the hopper may be regulated. The lower end of the hopper H delivers the material to the endless traveling belt B which may be composed of leather, canvas or other suitable belt material. This belt B travels over and is supported by the platform or table A which extends from the guide roll C to the guide roll D, being interrupted or apertured at $a$. Pressure rolls L and U situated below and above the table A respectively, operate upon the material carried by the belt B through the aperture in the table at $a$. An adjustment or take up roll is provided at R and this roll has bearings $q$ at either end of the roll so that the two end bearings of the roll may be independently adjusted. The lower pressure roll L is mounted in fixed bearings at such a height that the belt B passing across the aperture $a$ in the table A is tangent to the roll L. The roll U is mounted in bearings on vertically adjustable boxes $g^5$, these boxes being attached to rods $r$ which at their upper ends are surrounded by springs W and are threaded to receive nuts $w$. The springs W are compressible between the nuts $w$ and the yoke Y so that by screwing up the nuts $w$, downward pressure may be brought to bear between the roll U and the roll L. The minimum pressure, under these conditions, with which the upper roll U bears upon material between it and the lower roll L is that represented by the total weight of the upper roll and members attached to it. Parallel picker rolls S, S' are mounted in bearings and extend across and above the table A between the hopper A and the pressure roll U. These pickers are arranged spirally as shown in Fig. 1 and rotate so as to brush off surplus material and to deliver a band of material of substantially uniform thickness to pass between the pressure rolls L and U; and also, by reason of the spiral arrangement, to move surplus material to right and left off the belt B into suitable receptacles (not shown) whence the surplus material may be returned to the hopper H. These picker rolls are driven from the pulley P by the belt $p$ and the pulley P' (Fig. 1). A short belt $p'$ joins the pulleys $P^2$, $P^3$ of which the latter has a larger diameter so that the rolls S' is driven at greater velocity than the roll S.

The mechanism shown and described forms the first division or department of the machine in which the material is treated in a dry condition.

The other or wet division or department of the machine presents a structural resemblance to the first division and comprises the table A', apertured at $a'$, which supports the endless belt B', the guide rolls C', D', adjustment roll R' independently adjusted at either end as by devices $q'$, a lower pressure roll L' and an upper pressure roll U', the latter mounted in a movable box $q'$ which is provided with rods $r'$, springs W', adjusting nuts $w'$ and the yoke Y' wherewith to increase or diminish the pressure exerted by the roll U' upon material between it and the roll L'. The rolls and belts are driven by a pinion G on the shaft with the pulley P, this pinion meshing with the spur gear G' which turns the roll U', this in turn meshing with gear $G^2$ which turns the roll L', this in turn with the intermediate or idler gear $G^3$ which meshes with gear $G^4$ to drive the roll L which in turn meshes with gear $G^5$ to drive roll U.

Above the table A', and preferably near the guide roll D', I arrange a sprinkler pipe V which extends across and above the table and is suspended by the pipe V' through which water is conducted to the sprinkler. The sprinkler pipe V is provided with numerous apertures in its lower side, and in order to insure uniform distribution of water over the belt B and the material on it, the sprinkler V is oscillated from side to side across the belt B' by means of the rocking lever $V^3$ mounted in bearings $V^4$ at one side of the machine and taking into the cam $V^5$, mounted on the shaft with the pinion G, and at its lower end forked between collars at $V^6$ on the sprinkler pipe V. Thus, even if some of the apertures in the pipe V should become clogged, the vibration of the pipe will insure an even distribution of water.

If the materials operated on are properly compounded and manipulated no danger need be apprehended from the sticking of any of the material to the rolls. Nevertheless, to guard against the contingency of material sticking to the roll U' I provide a scraper at $x$ and a trough $x'$ to remove and catch material which may adhere to the roll U'.

At the delivery end of the machine a cutting off device may be provided such as indicated in the drawings wherein F represents cam-rollers and K a vertically sliding chopper which descending at intervals upon the sheet of material emerging from the machine will cut off measured lengths, depositing them, if desired, upon a platform L which may be mounted upon lowering devices such as indicated at N (Fig. 2). The driving mechanism for the cams F is not shown; any suitable connections to the gear train of the machine will serve.

That part of the machine which operates on the material after it has been wet by the sprinkler pipe V constitutes what may be termed the wet department or division of the machine.

Between the terminal rolls D, D' of the dry division and the wet division respectively, there is necessarily a short gap and this gap is for the most part filled by the bridge bar E which extends across the machine, having an upper surface preferably made smooth (as by attaching a plate of polished metal) and which is substantially in the same plane as the tops of the belts B and B' which are supported by the tables A and A' respectively. The top of the bridge bar E may with advantage be crowned or rounded.

The operation of the machine is as follows: Assuming that finished slabs of fiber concrete three-sixteenths of an inch thick are desired, the hopper gate H' is so adjusted and the picker rolls S, S' are so arranged that the feed of material and the combing and leveling operation of the picker rolls delivers a band or layer of this material traveling upon the belt B, which layer or band is about three-quarters of an inch deep. The pressure exerted between the rolls U and L is so adjusted that a layer or band of material in passing between these rolls is compacted while still dry to about one-half its original depth; that is to say, in the case assumed for illustration, to a dry compressed band about three-eighths of an inch deep. This compression confers upon the band or layer of material an integrity and firmness which enables it to project itself across the slight gap between the conveyer belt B and the bridge bar E and also across the similar gap between the bridge bar E and the belt B' and also enables the band of material to slide over the bridge bar E without impairment of its smoothness, integrity and uniformity. On thus leaving the dry division of the machine, the layer of dry compressed material is supplied with water from the vibrating sprinkler pipe V and this water penetrates to all parts of the layer. The rate of travel of the layer and therefore of the belts B and B' and the distance between pipe V and roll U' should be such that by the time any portion of the material reaches the pressure rolls U' and L', the water supplied to it will have thoroughly penetrated to the bottom of the layer.

The pressure devices in the wet division of the material are so adjusted as to exert a pressure upon the wet layer of material sufficient to compress it finally to a thickness of three-sixteenths of an inch in the case assumed for illustration.

The action of the water upon the band of material previously dry-compressed produces a visible compacting or contracting of the layer even before the rolls U', L' operate upon it, so that when the materials are properly compounded and the amount of water supplied is regulated within the rules of proportion hereinabove indicated, the traveling pressure exerted by the rolls U' and L' adequately compacts the material without any considerable portion of it adhering to the roll U'.

The slabs or sheets cut from the continuously progressing band are preferably stacked up in presses with sheets of metal between the sheets of fiber-concrete and there held under compression until they are dry. Sheets or slabs of practically any desired length may be formed in the machine by the process above described and will be found to have ample strength and consistency for structural and other useful purposes.

Certain precautions should be observed in the design of the operating parts of such a machine as above described. The pressure rolls both in the wet and dry divisions of the machine should be of ample diameter; I have found that rolls 24 inches in diameter serve the purpose well. The degree of pressure exerted between the pairs of rolls will depend upon the thickness and the width of the sheet of material operated upon. In forming finished sheets three-sixteenths of an inch thick as above described, the band or sheet being 18 inches wide, I have found that a total pressure between the rolls of the dry division of 150 pounds and between the rolls of the wet division of about 1000 pounds, are adequate to obtain the intended result.

The combing action of the picker rolls S and S' in addition to leveling off the layer of material, performs a useful function in combing the fibers and also in covering the upper fibers with the comminuted cement. Between the picker roll S' and the roll U, the asbestos fibers are seldom, if ever, visibly discernible at the top of the band of material.

The physical conditions to be secured for the practice of my invention, whatever may be the specific or subordinate variations in process or apparatus, are; progressive advance of the materials operated on, relatively to pressure devices, successive applications of pressures, first to the material when in a substantially dry state, second to the material in a wet state and in its preparatory compacted condition. It is of primary importance that the dry-pressing shall compact the mixture to such density that after a setting liquid is applied thereto, it will not stick to pressure devices which operate on the wet mixture; in other words, the preliminary dry-pressing must be such as to produce a density in the mixture which gives it cohesion superior to any tendency to adhere to the other objects—notably the pressure devices, with which it comes in contact after being wet. An important, though relatively a secondary physical condition is the provision of distinct dry and wet departments in the apparatus, by which the wetting liquid is confined to the wet department and does not encroach upon the dry department. For obvious reasons continuous or traveling pressure is preferable, and this involves substantially uniform and continuous feed; this however is another physical condition of secondary value. The primary physical conditions afford a test by which equivalents may be known and recognized.

What I claim and desire to secure by Letters Patent is:

1. The process of forming sheets of fiber and cementitious material, which consists in first making a layer of the fibers and comminuted cementitious material, dry and intermixed, then compacting the said layer, while still dry, then applying a liquid appropriate to the cementitious material, and thereafter further compacting the wet layer.

2. The process of forming sheets of fiber-concrete which consists in first making a layer of fiber and comminuted hydraulic cement, dry and intermixed, then compacting the said layer, while still dry, then applying a setting liquid to the dry-compacted layer, and thereafter further compacting the wet layer.

3. The process of forming sheets of fiber concrete, which consists in first forming a layer of dry thoroughly intermixed fiber and comminuted cement, then conveying said layer as a continuous band, subjecting said band, while dry, to compacting pressure which travels along the band, then wetting the dry-compressed band with a setting liquid, and thereafter subjecting the wet band to further traveling pressure.

4. The process of forming sheets of fiber-concrete, which consists in first forming a layer of dry thoroughly intermixed asbestos fiber and hydraulic cement, then compacting said layer while still dry, to about half its original thickness, then applying a setting liquid to the dry-compacted layer, and thereafter compacting the layer to about one fourth of its original thickness.

5. The process of forming sheets of fiber-concrete, which consists in first forming a layer of dry thoroughly intermixed asbestos fiber and hydraulic cement, then conveying said layer as a continuous band, subjecting said band while dry to compacting pressure which travels along the band, thereby reducing it to about one half its original thickness, then wetting the dry-compacted band with a setting liquid, and thereafter further compacting the band to about one fourth of its original thickness.

6. The process of forming sheets of fiber-concrete which consists in first forming a layer of dry intermixed asbestos fiber and comminuted hydraulic cement, then compacting the said layer, while still dry, then applying a setting liquid to the dry-compacted layer, and thereafter further compacting the wet layer.

7. The process of forming sheets of fiber-concrete which consists in first forming a layer of dry thoroughly intermixed asbestos fiber and comminuted hydraulic cement, then conveying said layer as a continuous band, subjecting said band while dry to compacting pressure which travels along the band, then wetting the dry-compacted band with a setting liquid, and thereafter subjecting the wet band to further traveling pressure.

8. The process of forming sheets of fiber-concrete, which consists in first forming a layer of dry thoroughly mixed fiber and comminuted cement, combing the surface of the layer while dry, then compacting the said layer, while still dry, then wetting the dry-compacted layer with a setting liquid, and thereafter further compacting the wet layer.

9. The process of forming sheets of fiber-concrete which consists in first forming a layer of dry thoroughly intermixed asbestos fiber and hydraulic cement, the latter largely preponderating, compacting the layer while dry, then applying a setting liquid to the dry-compacted layer, and thereafter further compacting the wet layer.

10. The process of forming sheets of fiber-concrete, which consists in first forming a band of dry thoroughly intermixed asbestos fiber and hydraulic cement, the latter largely preponderating, subjecting said band, while dry, to traveling compacting pressure, then applying a setting liquid thereto, and thereafter subjecting the wet band to further traveling compacting pressure.

11. The process of forming sheets of fiber-concrete, which consists in first forming a layer of dry thoroughly intermixed fiber and cement, then compacting said layer, while dry, to such density as prevents the layer from sticking to pressure devices when wet, then applying a setting liquid to the dry-compacted layer, and thereafter further compacting the wet layer.

12. The process of forming sheets of fiber-concrete, which consists in first forming a layer of dry thoroughly intermixed asbestos fiber and hydraulic cement, then compacting said layer, while dry, to such density as prevents the layer from sticking to pressure devices when wet, then applying a setting liquid to the dry-compacted layer, and thereafter further compacting the wet layer.

Signed by me at Boston, Massachusetts this twenty fourth day of January 1910.

CHARLES LADD NORTON.

Witnesses:
ODEN ROBERTS,
CHARLES D. WOODBERRY.